United States Patent
Wagawa et al.

(10) Patent No.: US 10,662,506 B2
(45) Date of Patent: May 26, 2020

(54) METHOD FOR PRODUCING PLATINUM-BASED ALLOY POWDER

(71) Applicant: TANAKA KIKINZOKU KOGYO K.K., Tokyo (JP)

(72) Inventors: Akitoshi Wagawa, Kanagawa (JP); Akio Nagaoka, Kanagawa (JP); Takehiko Kawai, Kanagawa (JP); Takahisa Yamazaki, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 427 days.

(21) Appl. No.: 15/501,335

(22) PCT Filed: Aug. 7, 2015

(86) PCT No.: PCT/JP2015/072563
§ 371 (c)(1),
(2) Date: Feb. 2, 2017

(87) PCT Pub. No.: WO2016/021725
PCT Pub. Date: Feb. 11, 2016

(65) Prior Publication Data
US 2017/0226612 A1    Aug. 10, 2017

(30) Foreign Application Priority Data

Aug. 8, 2014 (JP) ................. 2014-162725

(51) Int. Cl.
*C22C 1/04* (2006.01)
*B22F 1/00* (2006.01)
(Continued)

(52) U.S. Cl.
CPC ............ *C22C 1/0466* (2013.01); *B01J 23/44* (2013.01); *B01J 23/464* (2013.01); *B01J 23/468* (2013.01);
(Continued)

(58) Field of Classification Search
None
See application file for complete search history.

(56) References Cited

U.S. PATENT DOCUMENTS

2003/0079566 A1\* 5/2003 Biberbach ............... B22F 9/24
75/255
2007/0292744 A1\* 12/2007 Lopez ................... B01J 23/468
429/418
(Continued)

FOREIGN PATENT DOCUMENTS

JP    H10-102107 A    4/1998
JP    H10-183208 A    7/1998
(Continued)

OTHER PUBLICATIONS

Rasten et al. Proceedings Electrochemical Soc., 2001, vol. 2001-23, p. 151-164 (Year: 2001).\*
(Continued)

*Primary Examiner* — Alexandra M Moore
*Assistant Examiner* — Adil A. Siddiqui
(74) *Attorney, Agent, or Firm* — Orrick, Herrington & Sutcliffe LLP; Joseph A. Calvaruso; K. Patrick Herman

(57) ABSTRACT

The present invention relates to a method for producing a platinum-based alloy powder, the method comprising a heat treatment of a mixed powder containing a platinum-based powder composed of at least one selected from the group consisting of platinum and platinum compound, a platinum group metal-based powder composed of at least one selected from the group consisting of iridium, rhodium, palladium, and compound containing at least one of them, and an alkaline-earth metal compound, wherein specific surface area of the platinum group metal-based powder is 30 $m^2/g$ or more and D90 of the mixed powder is 1.0 μm or less. According to the method for producing a platinum-based alloy powder of the invention, it is possible to produce a (Continued)

platinum-based alloy powder that has a desired particle diameter, also has a sharp particle size distribution, and has high purity and crystallinity.

6 Claims, 10 Drawing Sheets

(51) Int. Cl.
    *C22C 5/04* (2006.01)
    *C22F 1/14* (2006.01)
    *B22F 9/30* (2006.01)
    *B22F 9/20* (2006.01)
    *B01J 35/02* (2006.01)
    *B01J 35/10* (2006.01)
    *B01J 35/00* (2006.01)
    *B01J 37/04* (2006.01)
    *B01J 23/46* (2006.01)
    *B01J 23/44* (2006.01)
    *B01J 37/06* (2006.01)
    *B01J 37/08* (2006.01)
    *B01J 37/00* (2006.01)

(52) U.S. Cl.
    CPC ........... *B01J 35/002* (2013.01); *B01J 35/023* (2013.01); *B01J 35/1014* (2013.01); *B01J 37/0036* (2013.01); *B01J 37/04* (2013.01); *B01J 37/06* (2013.01); *B01J 37/08* (2013.01); *B01J 37/082* (2013.01); *B22F 1/0014* (2013.01); *B22F 1/0018* (2013.01); *B22F 9/20* (2013.01); *B22F 9/30* (2013.01); *C22C 5/04* (2013.01); *C22F 1/14* (2013.01); *B22F 2301/25* (2013.01); *B22F 2998/10* (2013.01)

(56) References Cited

U.S. PATENT DOCUMENTS

2014/0065043 A1* 3/2014 Kato ................... B01D 53/944
                                                                                                                 423/213.5
2014/0086966 A1* 3/2014 Matsushita ............. A61K 8/27
                                                                                                                  424/401

FOREIGN PATENT DOCUMENTS

JP       2006-199982 A    8/2006
JP       2011-162868 A    8/2011

OTHER PUBLICATIONS

EP, Extended European Search Report dated Jul. 27, 2017 in connection with European patent application 15830315.6, dated Jul. 27, 2017.

WO, International Search Report for PCT/JP2015/072563, dated Nov. 2, 2015.

* cited by examiner

[Fig. 1]
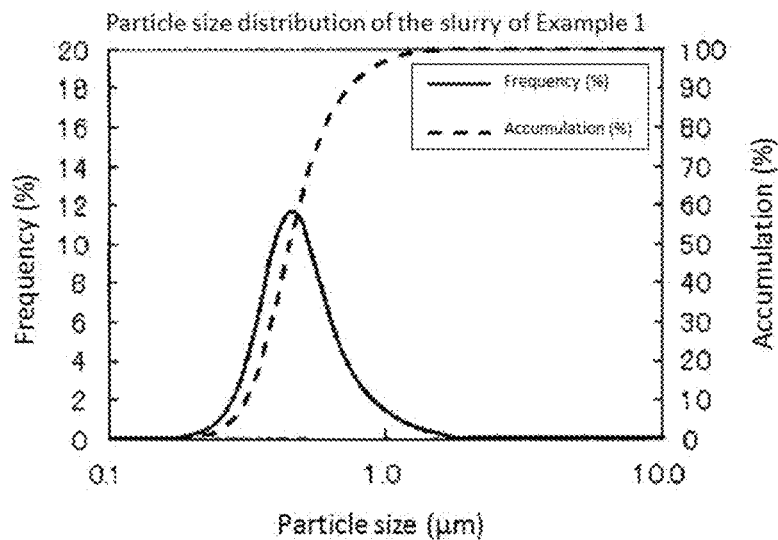
[Fig. 2]
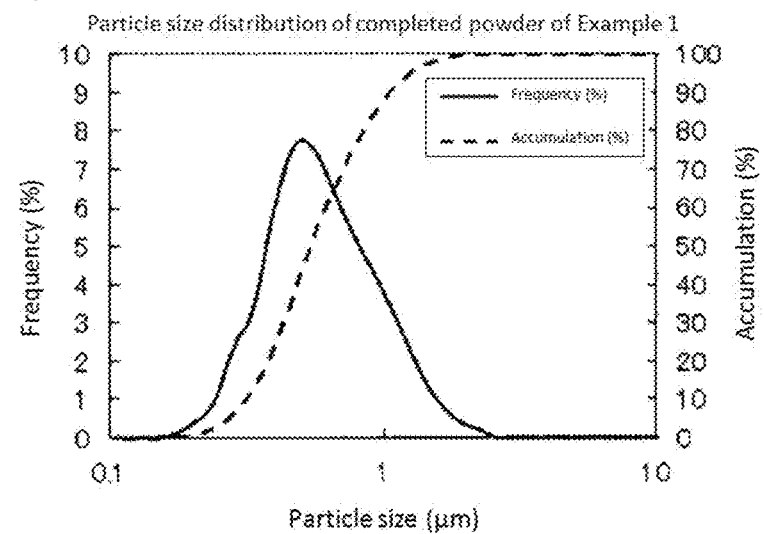
[Fig. 3]
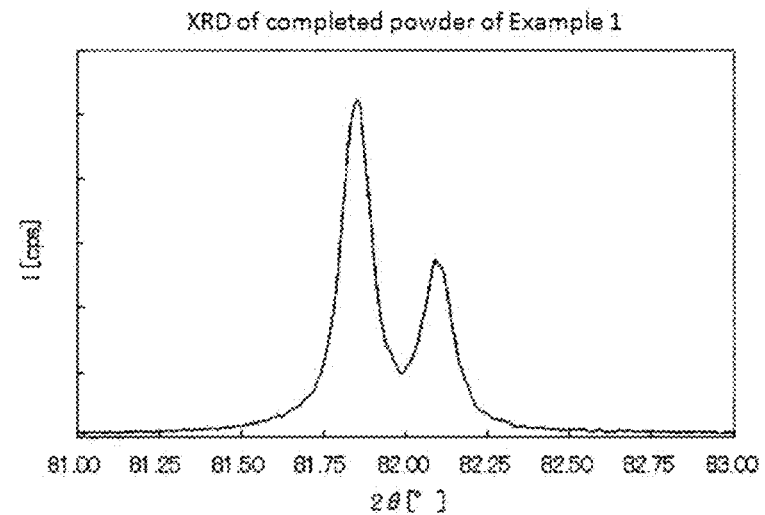

[Fig.4]
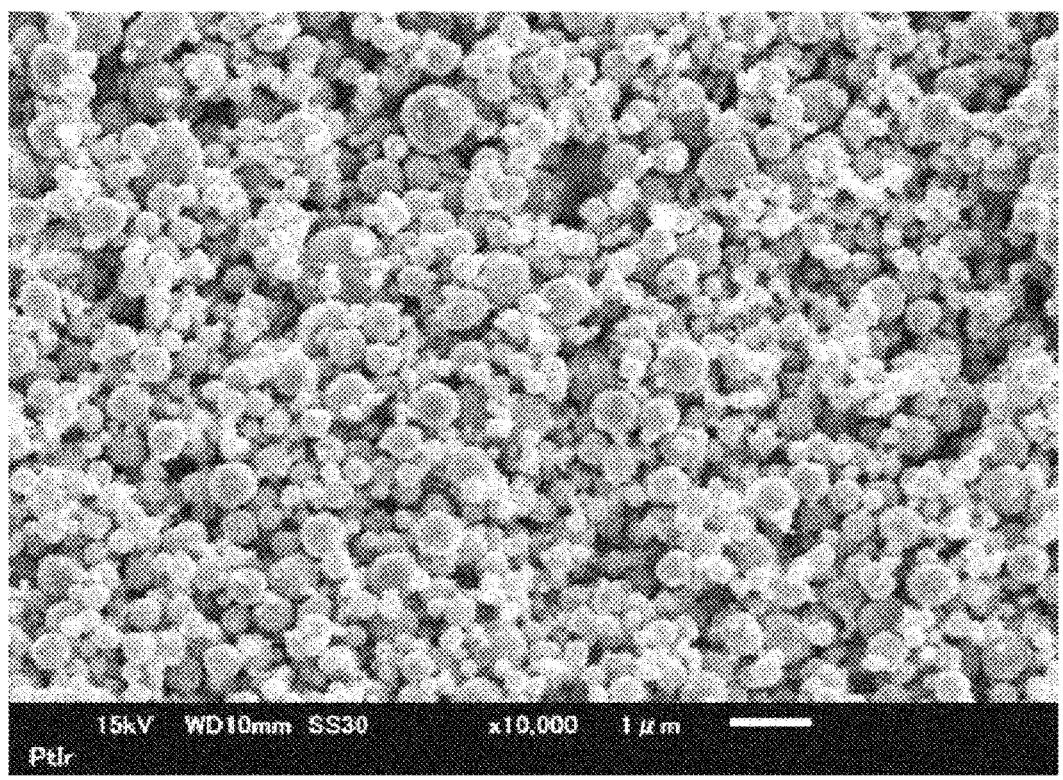
[Fig. 5]
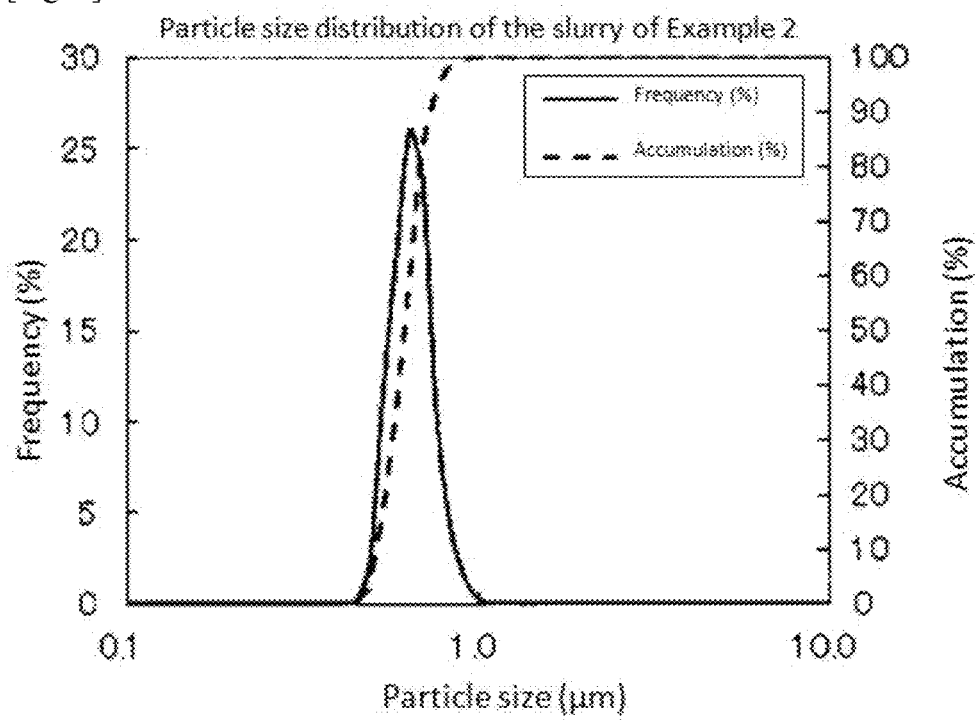

[Fig. 6]
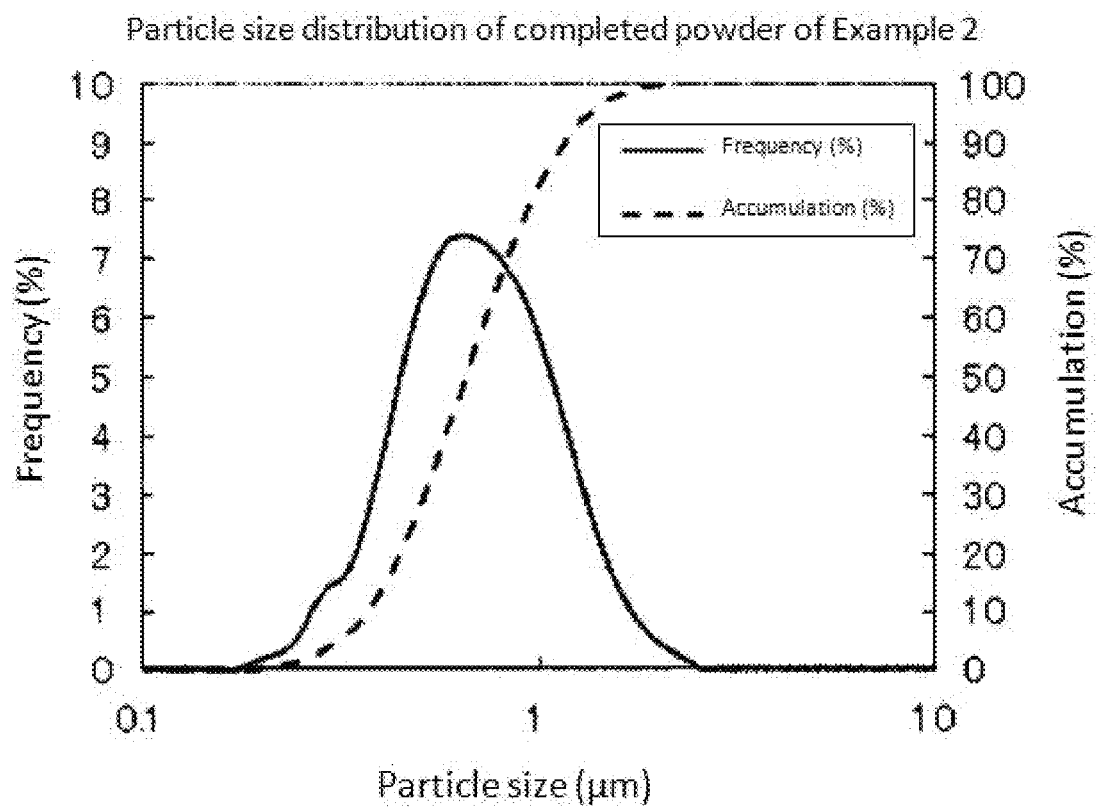
[Fig. 7]
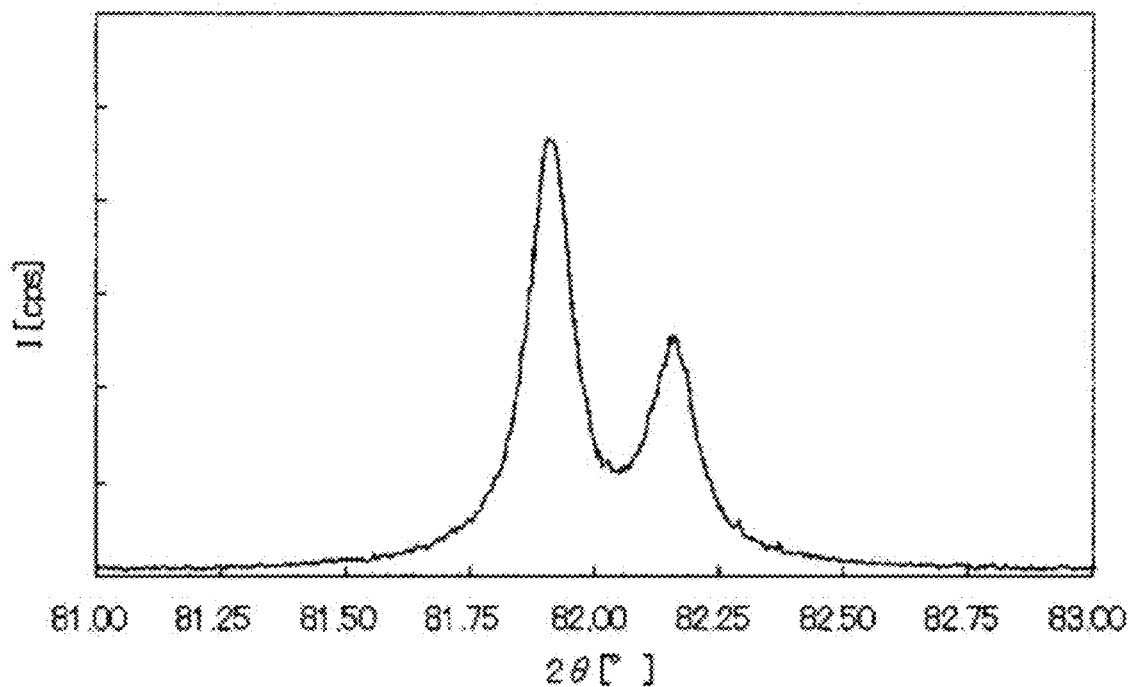

[Fig.8]
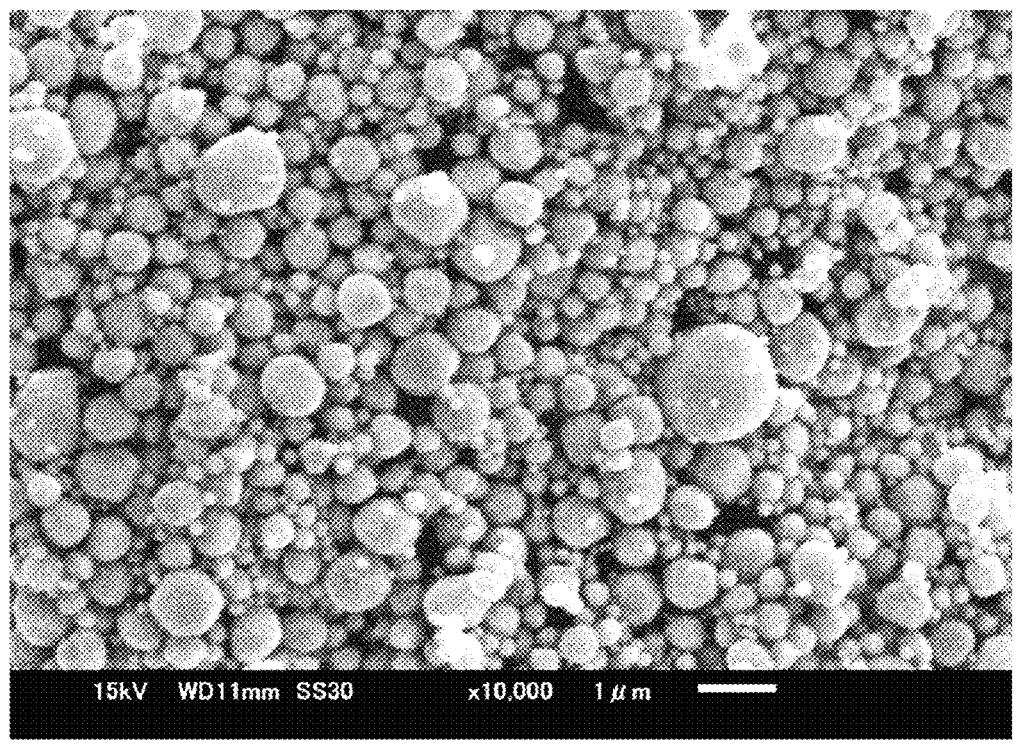
[Fig. 9]
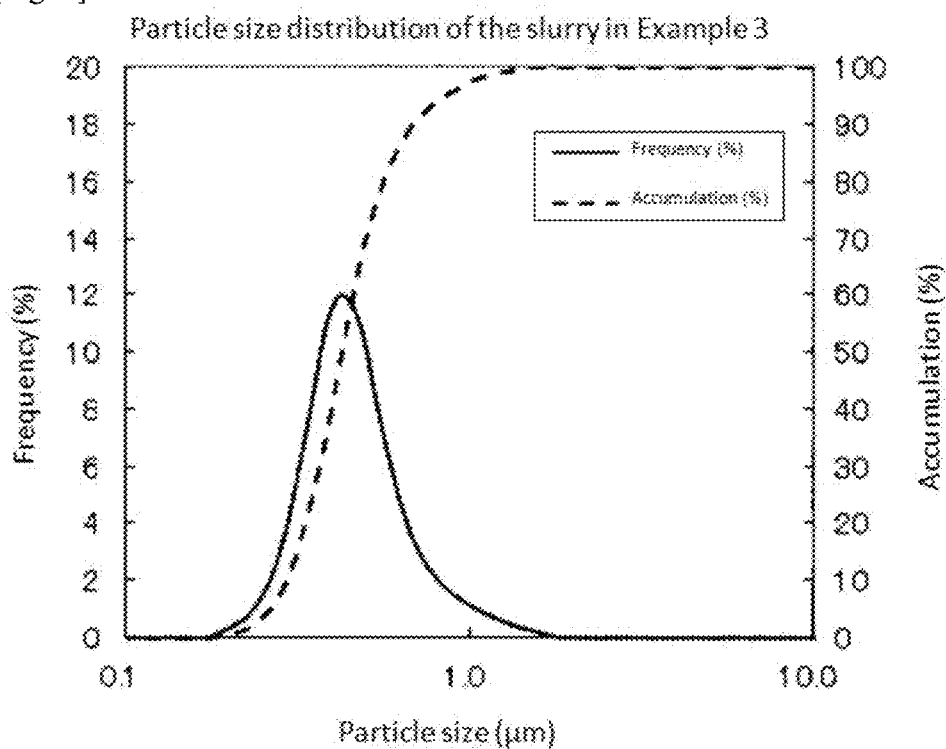

[Fig. 10]
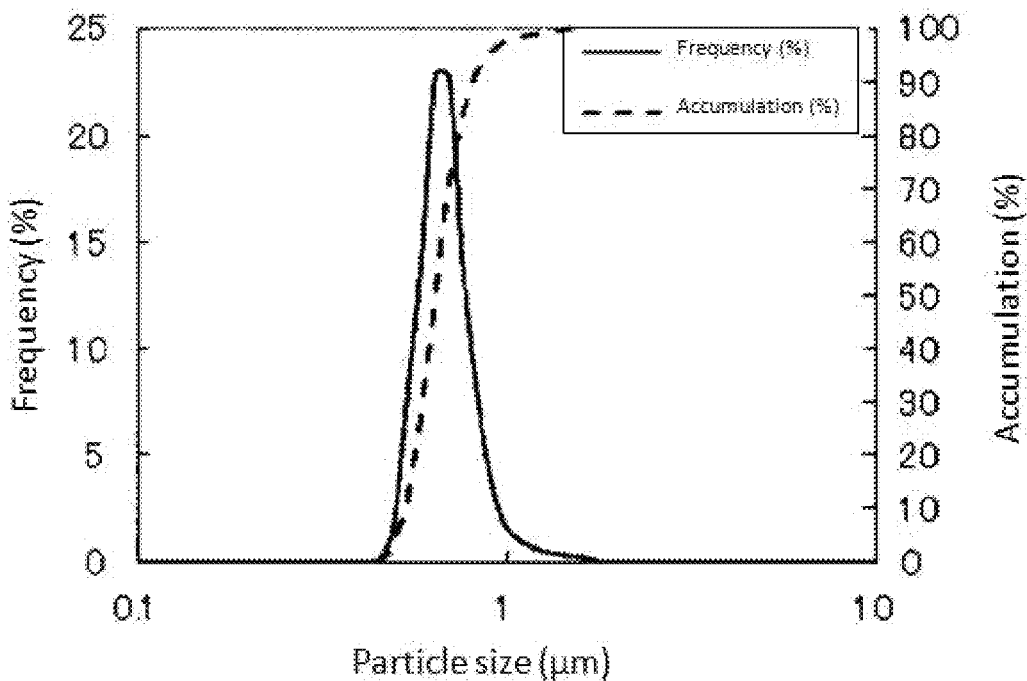
[Fig. 11]
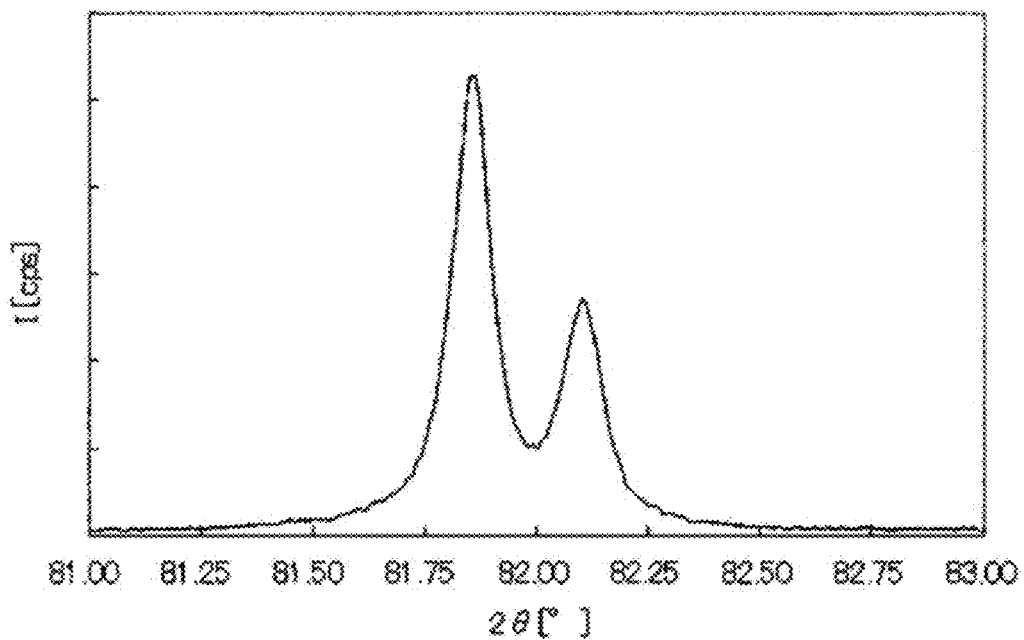

[Fig. 12]
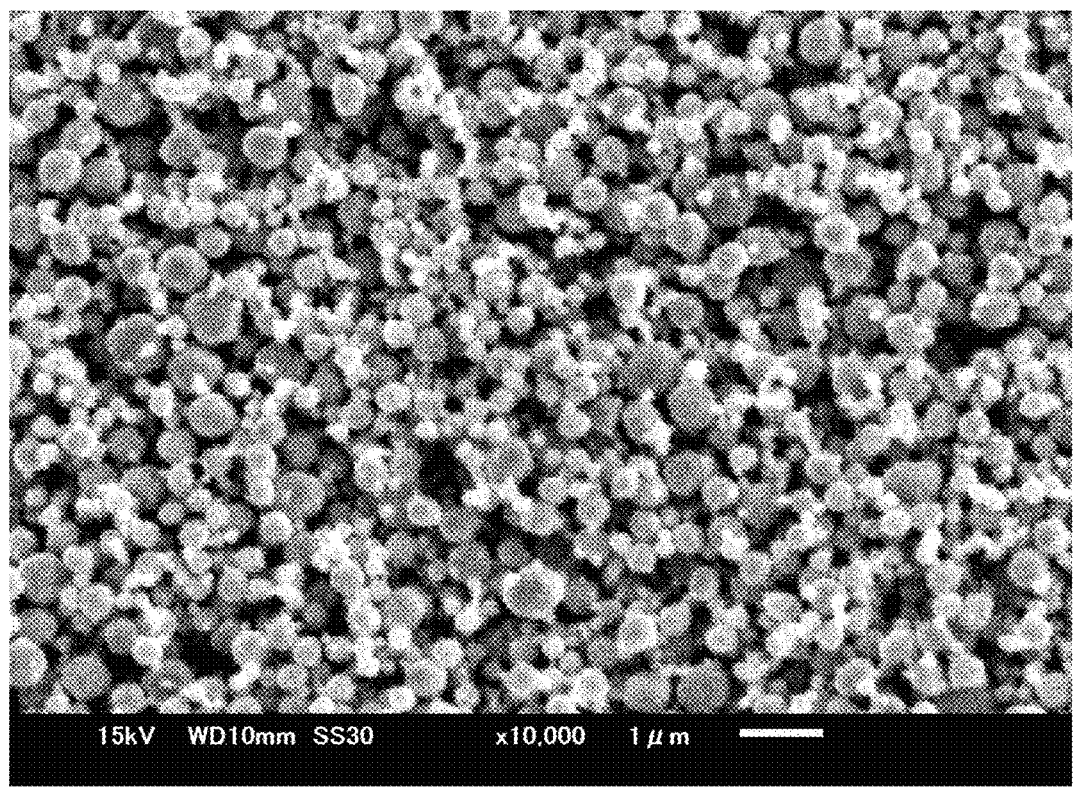
[Fig. 13]
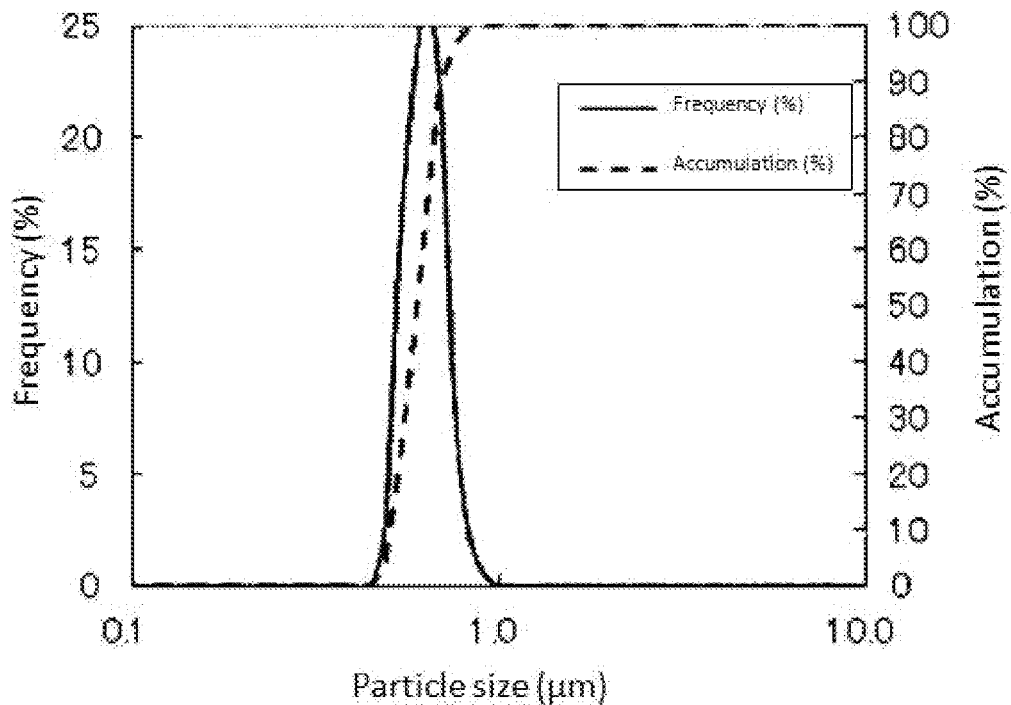

[Fig. 14]
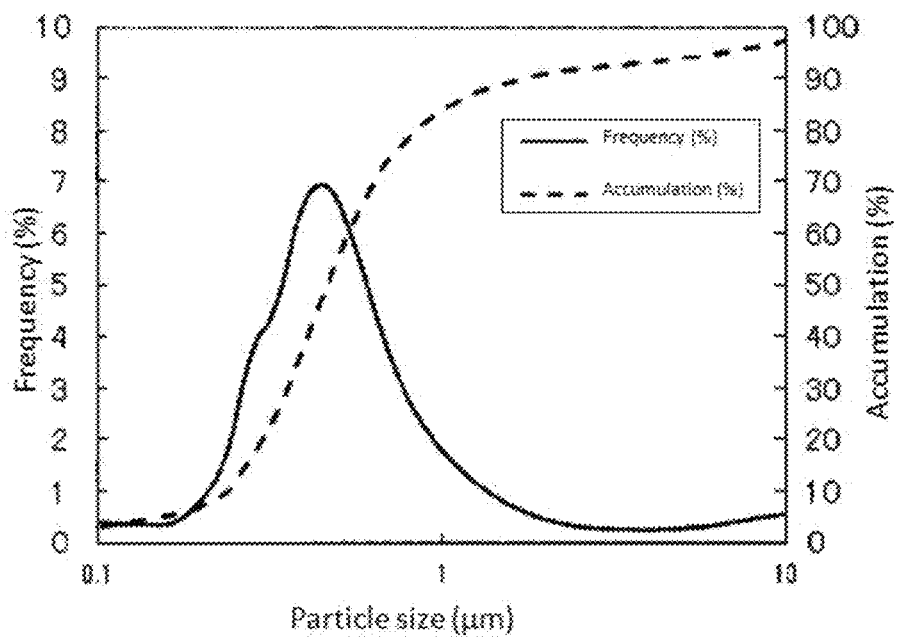
[Fig. 15]
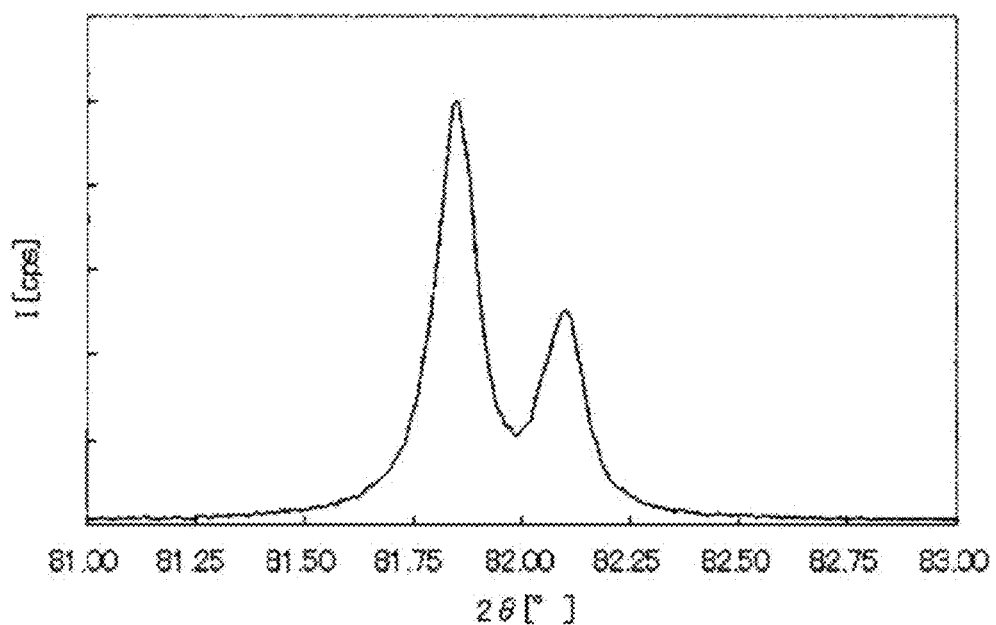

[Fig. 16]
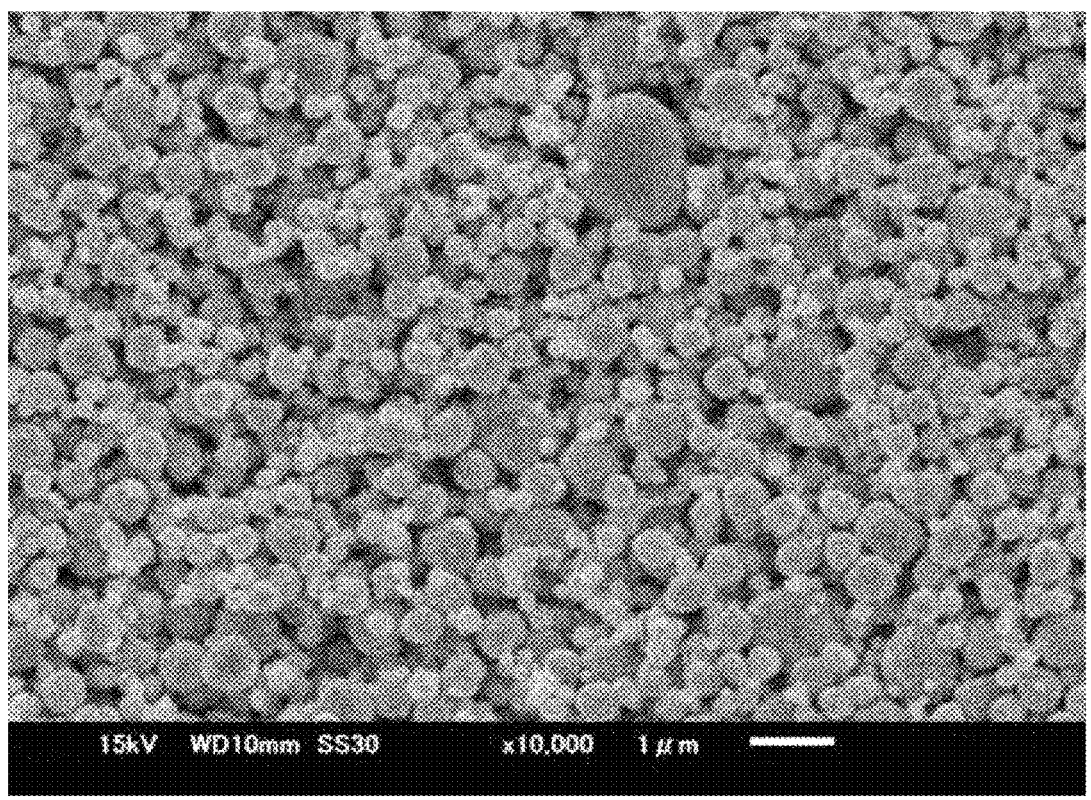
[Fig. 17]
Particle size distribution of the slurry of Comparative Example 2
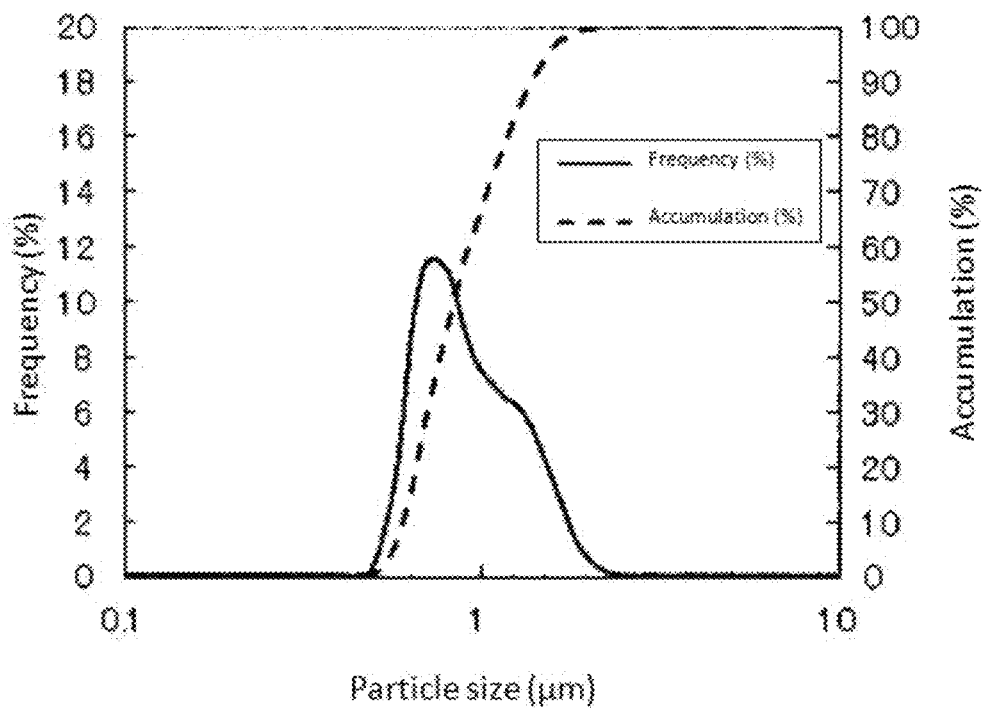

[Fig. 18]
Particle size distribution of completed powder of Comparative Example 2
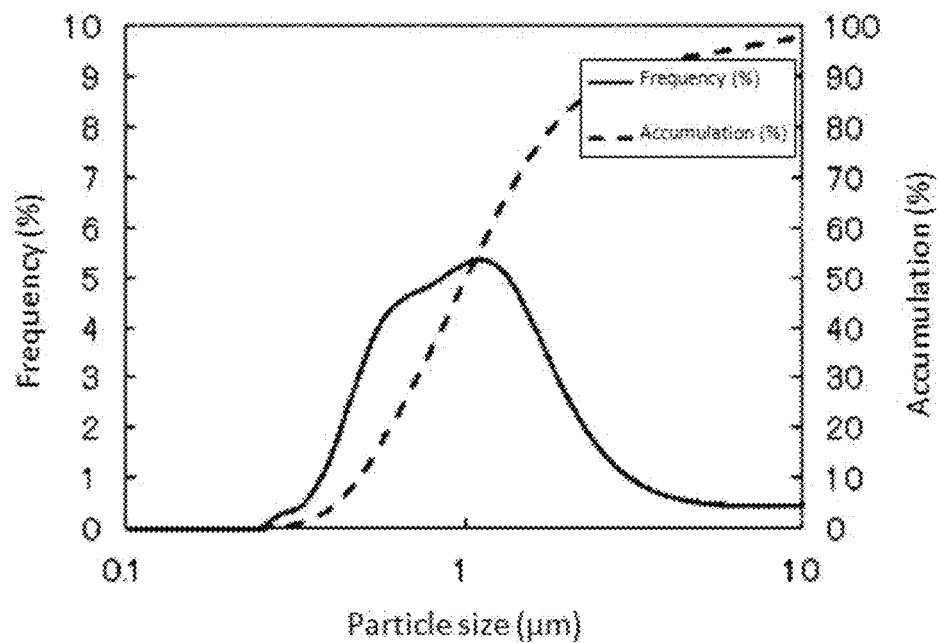
[Fig. 19]
XRD of completed powder of Comparative Example 2
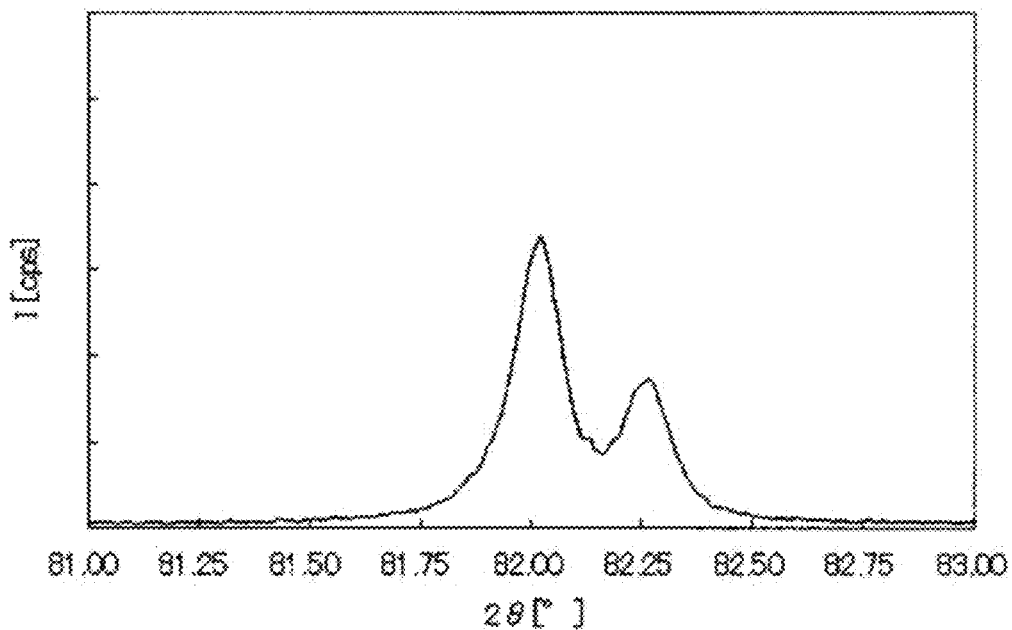

[Fig. 20]
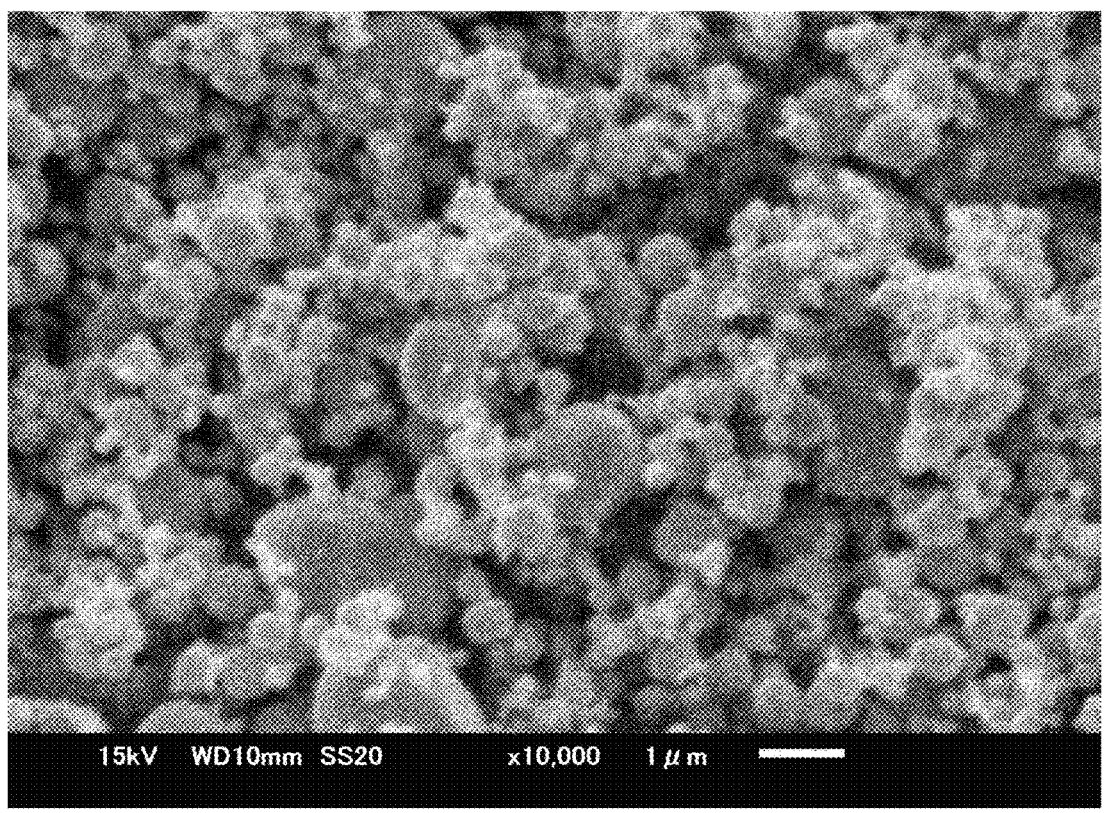
[Fig. 21]
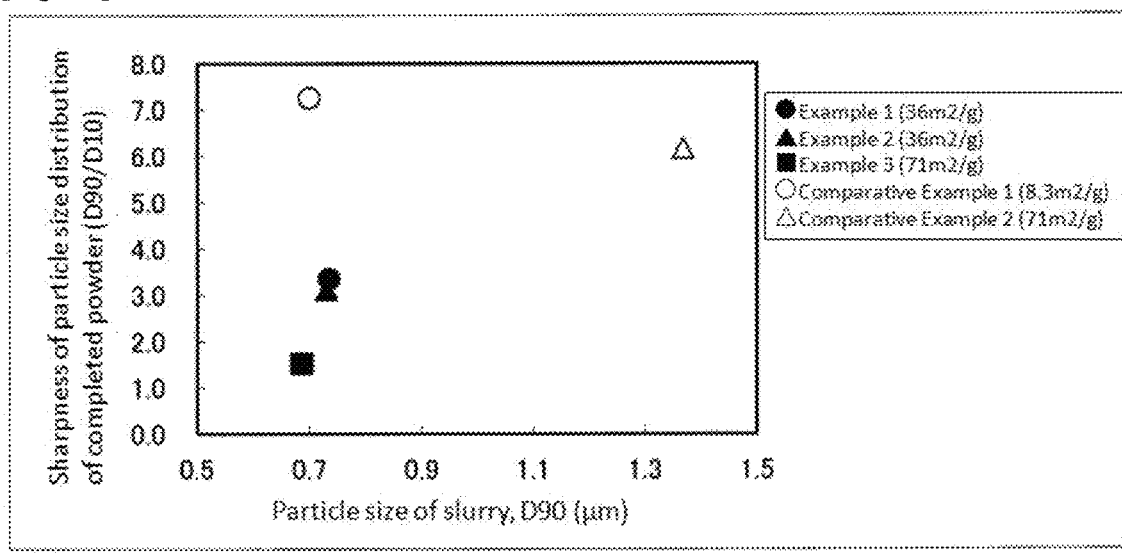

METHOD FOR PRODUCING PLATINUM-BASED ALLOY POWDER

TECHNICAL FIELD

The present invention relates to a method for producing a platinum-based alloy powder. More specifically, it relates to a method for producing an alloy powder of platinum and at least one selected from the group consisting of iridium, rhodium, and palladium.

BACKGROUND ART

Hitherto, alloy powders of platinum and iridium, rhodium, and/or palladium have been used in high-temperature corrosive uses such as automobile exhaust gas catalysts and sensors. Recently, with downsizing and the like of products such as sensor and contact, it is required for the alloy powders to have a desired particle diameter and also to be sharp in particle size distribution.

Patent Document 1 discloses a method for producing a platinum-rhodium alloy powder by mixing a platinum fine powder or a platinum compound fine powder, a rhodium fine powder or a rhodium compound fine powder, and a calcium carbonate powder, followed by a heat treatment.

Moreover, Patent Document 2 discloses a method for producing a noble metal fine powder comprising a step of obtaining an aggregate of noble metal fine particles, a step of obtaining a mixture containing disintegrated noble metal fine particles by disintegrating the aggregate of the noble metal fine powder together with at least one of alkali metal carbonate salt and alkaline-earth metal carbonate salt, and a step of obtaining noble metal fine particles by heat-treating the mixture at 1000° C. or higher in an inert gas atmosphere and subsequently treating the heat-treated product with an acid.

BACKGROUND ART DOCUMENTS

Patent Documents

Patent Document 1: JP-A-H10-102107
Patent Document 2: JP-A-2011-162868

SUMMARY OF THE INVENTION

Problems that the Invention is to Solve

However, in any of Patent Document 1 and Patent Document 2, a sufficient study has not been performed for obtaining an alloy powder that has a desired particle diameter and is sharp in particle size distribution.

An object of the present invention is to provide a method for producing a platinum-based alloy powder, the method being capable of producing a platinum-based alloy powder that has a desired particle diameter, also has a sharp particle size distribution, and has high purity and crystallinity.

Means for Solving the Problems

As a result of extensive studies for achieving the above object, the present inventors have found that the above problems can be solved by a method for producing a platinum-based alloy powder using one having a specific surface area in a specific range as the platinum group metal-based powder composed of at least one selected from the group consisting of iridium, rhodium, palladium, and compound containing at least one of them, which is one of raw materials of the platinum-based alloy powder, and also using a mixed powder whose D90 falls within a specific range. Thus, they have accomplished the present invention.

That is, the invention provides a method for producing a platinum-based alloy powder, comprising a heat treatment of a mixed powder containing a platinum-based powder composed of at least one selected from the group consisting of platinum and platinum compound, a platinum group metal-based powder composed of at least one selected from the group consisting of iridium, rhodium, palladium, and compound containing at least one of them, and an alkaline-earth metal compound, wherein specific surface area of the platinum group metal-based powder is 30 m$^2$/g or more and D90 of the mixed powder is 1.0 μm or less.

In the method for producing a platinum-based alloy powder, temperature of the heat treatment is preferably 1000° C. or higher.

In the method for producing a platinum-based alloy powder, specific surface area of the platinum-based powder is preferably 20 to 100 m$^2$/g.

In the method for producing a platinum-based alloy powder, the amount of the alkaline-earth metal compound in the mixed powder is preferably 0.5 to 10 times the total amount of the platinum-based powder and the platinum group metal-based powder based on weight.

In the method for producing a platinum-based alloy powder, D90/D10 of the platinum-based alloy powder to be obtained is preferably 4 or less.

In the method for producing a platinum-based alloy powder, D50 of the platinum-based alloy powder to be obtained is preferably 10 μm or less.

Advantage of the Invention

According to the method for producing a platinum-based alloy powder of the invention, it is possible to obtain a platinum-based alloy powder that has a desired particle diameter, also has a sharp particle size distribution, and has high purity and crystallinity. The platinum-based alloy powder thus obtained can be particularly suitably used for electrode, electrical contact, catalyst, and the like for use in sensor and the like.

BRIEF DESCRIPTION OF THE DRAWINGS

FIG. 1 is a graph showing measurement results of particle size distribution of the slurry prepared in Example 1.

FIG. 2 is a graph showing measurement results of particle size distribution of the platinum-iridium alloy powder obtained in Example 1.

FIG. 3 is a graph showing measurement results of X-ray diffraction of the platinum-iridium alloy powder obtained in Example 1.

FIG. 4 is a SEM photograph of the platinum-iridium alloy powder obtained in Example 1.

FIG. 5 is a graph showing measurement results of particle size distribution of the slurry prepared in Example 2.

FIG. 6 is a graph showing measurement results of particle size distribution of the platinum-iridium alloy powder obtained in Example 2.

FIG. 7 is a graph showing measurement results of X-ray diffraction of the platinum-iridium alloy powder obtained in Example 2.

FIG. 8 is a SEM photograph of the platinum-iridium alloy powder obtained in Example 2.

FIG. 9 is a graph showing measurement results of particle size distribution of the slurry prepared in Example 3.

FIG. 10 is a graph showing measurement results of particle size distribution of the platinum-iridium alloy powder obtained in Example 3.

FIG. 11 is a graph showing measurement results of X-ray diffraction of the platinum-iridium alloy powder obtained in Example 3.

FIG. 12 is a SEM photograph of the platinum-iridium alloy powder obtained in Example 3.

FIG. 13 is a graph showing measurement results of particle size distribution of the slurry prepared in Comparative Example 1.

FIG. 14 is a graph showing measurement results of particle size distribution of the platinum-iridium alloy powder obtained in Comparative Example 1.

FIG. 15 is a graph showing measurement results of X-ray diffraction of the platinum-iridium alloy powder obtained in Comparative Example 1.

FIG. 16 is a SEM photograph of the platinum-iridium alloy powder obtained in Comparative Example 1.

FIG. 17 is a graph showing measurement results of particle size distribution of the slurry prepared in Comparative Example 2.

FIG. 18 is a graph showing measurement results of particle size distribution of the platinum-iridium alloy powder obtained in Comparative Example 2.

FIG. 19 is a graph showing measurement results of X-ray diffraction of the platinum-iridium alloy powder obtained in Comparative Example 2.

FIG. 20 is a SEM photograph of the platinum-iridium alloy powder obtained in Comparative Example 2.

FIG. 21 is a graph showing a relationship between D90 of the slurry and D90/D10 of the alloy powder in each of Examples and Comparative Examples.

MODES FOR CARRYING OUT THE INVENTION

The following will describe embodiments of the method for producing a platinum-based alloy powder of the present invention in detail. Incidentally, hereinafter, the method for producing a platinum-based alloy powder of the invention is sometimes simply referred to as the production method of the invention.

In the production method of the invention, first, there is prepared a mixed powder containing a platinum-based powder composed of at least one selected from the group consisting of platinum and platinum compound, a platinum group metal-based powder composed of at least one selected from the group consisting of iridium, rhodium, palladium, and compound containing at least one of them, and an alkaline-earth metal compound.

The platinum-based powder (first raw material powder) to be used in the production method of the invention is composed of at least one selected from the group consisting of platinum (metal platinum) and platinum compound. The platinum-based powder preferably contains at least platinum (metal platinum) and is more preferably composed of platinum (metal platinum).

The platinum compound contains platinum, for example, in an amount of 60% by weight or more. Moreover, as the platinum compound, there may be mentioned platinum oxide, platinum hydroxide, platinum chloride, and the like. Of these, platinum oxide and platinum hydroxide are preferably used.

Specific surface area of the platinum-based powder is not particularly limited but, for example, is preferably 20 to 100 $m^2/g$, more preferably 30 to 80 $m^2/g$, and further preferably 40 to 60 $m^2/g$. When the specific surface area of the platinum-based powder is 20 $m^2/g$ or more, reactivity is rich and the alloy formation at the heat treatment tends to be facilitated. Moreover, when the specific surface area of the platinum-based powder is 100 $m^2/g$ or less, it is possible to produce the alloy powder steadily and inexpensively as compared with conventional techniques and, since the reactivity is not excessively high and moderate reactivity is exhibited at the heat treatment, particle diameter control of the alloy tends to be facilitated. Incidentally, in the invention, the specific surface area of the platinum-based powder is measured by the BET method. The BET specific surface area is, for example, measured in accordance with JIS Z 8830 (method for measuring specific surface area of a powder (solid) by gas adsorption). In addition, the primary particle diameter of the platinum-based powder determined by electron microscope (TEM) observation is not particularly limited but is preferably 2 to 20 nm.

The platinum group metal-based powder (second raw material powder) to be used in the production method of the invention is composed of at least one selected from the group consisting of iridium (metal iridium), rhodium (metal rhodium), palladium (metal palladium), and compound containing at least one of them. The platinum group metal-based powder preferably contains at least a compound containing at least one of iridium, rhodium, and palladium and more preferably is composed of a compound containing at least one of iridium, rhodium, and palladium.

The compound containing at least one of iridium, rhodium, and palladium contains at least one of iridium, rhodium, and palladium, for example, in an amount of 60% by weight or more. Moreover, examples of the compound containing at least one of iridium, rhodium, and palladium include a compound containing iridium (iridium compound), a compound containing rhodium (rhodium compound), a compound containing palladium (palladium compound), and the like.

The iridium compound contains iridium, for example, in an amount of 60% by weight or more. Moreover, as the iridium compound, there is preferably used an iridium inorganic compound such as an iridium hydrate, an iridium oxide, an iridium hydrous oxide, an iridium hydroxide, or a mixture of them, Particularly, an iridium inorganic compound constituted by iridium, hydrogen, and oxygen is more preferably used.

The rhodium compound contains rhodium, for example, in an amount of 60% by weight or more. Moreover, as the rhodium compound, there is preferably used an rhodium inorganic compound such as a rhodium hydrate, a rhodium oxide, a rhodium hydrous oxide, a rhodium hydroxide, or a mixture of them, Particularly, a rhodium inorganic compound constituted by rhodium, hydrogen, and oxygen is more preferably used.

The palladium compound contains palladium, for example, in an amount of 60% by weight or more. Moreover, as the palladium compound, there is preferably used an palladium inorganic compound such as a palladium hydrate, a palladium oxide, a palladium hydrous oxide, a palladium hydroxide, or a mixture of them, Particularly, a palladium inorganic compound constituted by palladium, hydrogen, and oxygen is more preferably used.

The platinum group metal-based powder to be used in the production method of the invention has a specific surface area of 30 $m^2/g$ or more. When the specific surface area of the platinum group metal-based powder is less than 30 m²/g, since the particle diameter of the platinum group metal-based powder is large, the reactivity at the heat treatment of the mixed powder decreases and thus there are generated necking and sintering of particles of the platinum-based powder themselves that have higher reactivity. Therefore, the resulting platinum group metal-based powder contains a coarse powder, so that it becomes difficult to make the particle size distribution sharp. In addition, metal composition without unevenness and a high crystallinity become difficult to obtain. Incidentally, in the invention, the specific surface area of the platinum group metal-based powder is measured by the BET method.

The specific surface area of the platinum group metal-based powder is preferably 30 m²/g or more, more preferably 35 m²/g or more, and most suitably 36 m²/g or more. On the other hand, an upper value of the specific surface area of the platinum group metal-based powder is not particularly limited but is, for example, 200 m²/g or less, preferably 100 m²/g or less, more preferably 80 m²/g or less, and most suitably 71 m²/g or less.

The alkaline-earth metal compound to be used in the production method of the invention functions as a particle growth inhibitor of the alloy powder in the heat treatment step to be mentioned later. Examples of the alkaline-earth metal compound to be used in the production method of the invention include inorganic salts such as carbonate salts, hydrogen carbonate salts, hydrochloride salts, and sulfate salts of alkaline-earth metals, and inorganic compounds such as oxides, chlorides, sulfides, hydroxides, and cyanides of alkaline-earth metals. As the alkaline-earth metal compound, carbonate salts and hydrogen carbonate salts of alkaline-earth metals are preferably used. Of these, calcium carbonate, magnesium carbonate, and strontium carbonate are more preferable and calcium carbonate is particularly preferable. Incidentally, the alkaline-earth metal compound may be used singly or two or more thereof may be used in combination.

Incidentally, the shape of the alkaline-earth metal compound before mixing and dispersing is not particularly limited but, from the viewpoints of handling and the like, is preferably in a powder form. Moreover, average particle diameter of the alkaline-earth metal compound in a powder form is not particularly limited but is, for example, 0.2 to 1.0 µm. The average particle diameter of the alkaline-earth metal compound in a powder form can be measured by a laser diffraction type particle size distribution measuring apparatus.

The mixed powder is obtained by charging the platinum-based powder (first raw material powder), the platinum group metal-based powder (second raw material powder), and the alkaline-earth metal compound into a suitable mixer such as a ball mill, a planetary ball mill, a bead mill, a planetary bead mill, or an attritor and mixing and dispersing them. Incidentally, at the time of mixing and dispersing the platinum-based powder, the platinum group metal-based powder, and the alkaline-earth metal compound, the mixed powder may be prepared by mixing and dispersing them alone or may be prepared as a suspension (slurry) by mixing and dispersing a mixture obtained by adding a solvent to them. Since an excessive aggregation of the platinum-based powder and the platinum group metal-based powder can be prevented and dispersion can be performed in a higher dispersion efficiency, it is preferable to prepare the slurry. Incidentally, as the solvent at the preparation of the slurry, water or an organic solvent or the like can be used but preferably, water having no risk of ignition can be used, and a dispersant such as a surfactant can be appropriately incorporated into water. Moreover, the concentration of the slurry (solid matter concentration) is not particularly limited but is, for example, 20 to 45% by weight.

In the production method of the invention, D90 of the mixed powder is adjusted so as to be 1.0 µm or less by mixing and dispersing the platinum-based powder, the platinum group metal-based powder, and the alkaline-earth metal compound. When D90 of the mixed powder is larger than 1.0 µm, the aggregate of the platinum-based powder and the platinum group metal-based powder is not sufficiently disintegrated and the alkaline-earth metal compound that is a particle growth inhibitor is not sufficiently dispersed, so that it becomes difficult to manufacture a platinum-based alloy powder that has a desired particle diameter and is sharp in particle size distribution. Moreover, there is a concern that the composition of the resulting platinum-based alloy powder becomes inhomogeneous. Incidentally, D90 of the mixed powder is preferably 0.9 µm or less and more preferably 0.8 µm or less. Here, D90 of the mixed powder means a particle diameter at which the integrated quantity reaches 90% in an integrated particle quantity curve obtained as a result of suspending the mixed powder in a solvent in which the mixed power does not dissolve and measuring particle size distribution by a wet laser diffraction method. For example, in the case where the slurry is prepared, D90 can be deduced by measuring the particle distribution by the wet laser diffraction method for the prepared slurry.

At the stage of compounding the platinum-based powder, the platinum group metal-based powder, and the alkaline-earth metal compound, usually, the platinum-based powder and the platinum group metal-based powder are present in a state that fine particles are aggregated. In the production method of the invention, a mixed powder whose D90 is 1.0 µm or less is prepared by disintegrating the platinum-based powder and the platinum group metal-based powder in a state that fine particles are aggregated, in the process of mixing and dispersing the platinum-based powder, the platinum group metal-based powder, and the alkaline-earth metal compound.

Here, D90 of the mixed powder can be appropriately adjusted to the above range by suitably selecting conditions such as sizes of the platinum-based powder, the platinum group metal-based powder, and the alkaline-earth metal compound, mixing time (dispersion time) of the platinum-based powder, the platinum group metal-based powder, and the alkaline-earth metal compound, the particle diameter and quantity of balls or beads to be used in the mixer, the peripheral speed of stirring blade of the mixer, and, in the case of preparing the slurry, the concentration of the slurry (solid matter concentration) and a dispersant. Moreover, the mixed powder may be washed with an appropriate solvent such as water or may be passed through a sieve having a suitable mesh, if necessary, before the heat treatment to be mentioned later.

In addition, the maximum particle diameter Dmax of the mixed powder is preferably 2.0 µm or less. When the maximum particle diameter Dmax of the mixed powder is 2.0 µm or less, an alloy powder having a sharp particle size distribution tends to be obtained after the alloy forming treatment through the heat treatment. Incidentally, Dmax of the mixed powder represents maximum particle diameter obtained as a result of suspending the mixed powder in a solvent in which the mixed power does not dissolve and measuring particle size distribution by a wet laser diffraction method.

At the preparation of the mixed powder, the mixing ratio of the platinum-based powder to the platinum group metal-based powder may be appropriately selected according to the alloy composition required for the obtained platinum-based alloy powder and is not particularly limited but is, as a weight ratio of the platinum-based powder to the platinum group metal-based powder (platinum-based powder: platinum group metal-based powder), 95:5 to 5:95, and preferably 90:10 to 20:80.

Moreover, the amount of the alkaline-earth metal compound at the preparation of the mixed powder is not particularly limited. However, the amount of the alkaline-earth metal compound in the mixed powder is preferably 0.5 to 10 times, more preferably 1 to 5 times the total amount of the platinum-based powder and the platinum group metal-based powder based on weight. When the amount of the alkaline-earth metal compound in the mixed powder is 0.5 times the total amount of the platinum-based powder and the platinum group metal-based powder based on weight or more, the compound satisfactorily functions as the particle growth inhibitor and the particle diameter can be suitably controlled, so that the case is preferable. Moreover, when the amount of the alkaline-earth metal compound in the mixed powder is 10 times the total amount of the platinum-based powder and the platinum group metal-based powder based on weight or less, production efficiency is good and suitable particle diameter control can be performed with excellent cost performance, so that the case is preferable.

In addition, in the case where the slurry is prepared, it is preferable to obtain the mixed powder by drying the slurry to remove the solvent before the heat treatment step to be mentioned later. The drying conditions may be appropriately adjusted according to the kind and amount of the solvent used but, for example, in the case of using water as the solvent, drying temperature is 90 to 150° C. and drying time is 16 to 36 hours.

In the production method of the invention, the platinum-based alloy powder is produced by a heat treatment of the mixed powder prepared as described above.

In the following, using, as an example, the case of using a platinum-based powder composed of platinum (metal platinum) (platinum powder), a platinum group metal-based powder composed of iridium (metal iridium) (iridium powder), and calcium carbonate as the alkaline-earth metal compound, there will be described formation mechanism of the platinum-based alloy powder formed by the heat treatment of the mixed powder.

Platinum is known to have heat diffusing ability higher than iridium under a high temperature. Therefore, platinum in the platinum powder gradually diffuses into the iridium particles in the neighboring iridium powder through the heat treatment. On the other hand, calcium carbonate in the mixed powder releases carbon dioxide through the heat treatment at about 800° C. to form calcium oxide. Therefore, in the heat treatment, diffusion of platinum into the iridium particles proceeds between the neighboring platinum powder and iridium powder in the presence of calcium oxide (the co-presence of calcium carbonate or calcium carbonate and calcium oxide in the case where pyrolysis of calcium carbonate does not proceed). Here, since the co-present calcium oxide or calcium carbonate (powder) does not react with platinum, it contributes to the formation of the alloy powder having objective properties while acting as an inhibiting factor of particle growth of the alloy. When the specific surface area of iridium is less than 30 m$^2$/g, i.e., in the case where the particle diameter of primary particles of iridium is large, the reactivity with the platinum particles decreases and bonding or particle growth of the platinum particles themselves firstly occur. Consequently, an alloy powder containing coarse powder is formed, the particle size distribution also becomes broad, and further compositional unevenness in the powder is generated.

After the heat treatment, the objective platinum-iridium alloy powder can be obtained by dissolving and removing calcium oxide by an acid treatment with nitric acid, hydrochloric acid, sulfuric acid, or the like and, if necessary, performing a water-washing treatment, a drying treatment, or the like.

Incidentally, in the above, explanation is performed using, as an example, the case of using the platinum powder, the iridium powder, and calcium carbonate as the alkaline-earth metal compound but, also in the other cases, the platinum-based alloy powders are formed through the same formation mechanism.

For example, in the case of using a platinum-based powder composed of a platinum compound (platinum compound powder), a platinum powder is formed through pyrolysis of the platinum compound powder by the heat treatment and the platinum powder is used for the formation of the platinum-based alloy powder similarly to the above.

Moreover, for example, in the case of using the platinum group metal-based powder composed of an iridium compound (iridium compound powder), an iridium powder is formed through pyrolysis of the iridium compound powder by the heat treatment and the iridium powder is used for the formation of the platinum-based alloy powder similarly to the above. Furthermore, for example, in the case of using the rhodium powder, the palladium powder, or the like, formation mechanism is the same as that in the case of using the iridium powder. Also in the case of using the rhodium compound powder, the palladium compound powder, or the like, formation mechanism is the same as that in the case of using the iridium compound powder.

In addition, for example, in the case of using magnesium carbonate as the alkaline-earth metal compound, the magnesium carbonate is converted into magnesium oxide through the heat treatment and is used for the formation of the platinum-based alloy powder similarly to the above.

Here, heat treatment temperature at the heat treatment of the mixed powder is not particularly limited but is preferably 1000° C. or higher, and more preferably 1200° C. or higher in the case of iridium and 1300° C. or higher in the case of rhodium. When the heat treatment temperature is 1000° C. or higher, the diffusion of the mixed powder proceeds and a platinum-based alloy having a sharper particle size distribution can be obtained, so that the case is preferable. Moreover, an upper limit of the heat treatment temperature is also not particularly limited but is preferably 1500° C. or lower and more preferably 1400° C. or lower. When the heat treatment temperature exceeds 1500° C., necking of the alloy particles themselves occurs and there is a case where a coarse powder is generated.

Also the heat treatment time at the heat treatment of the mixed powder is not particularly limited but is preferably 1 to 5 hours and more preferably 2 to 4 hours. When the heat treatment time is 1 hour or more, the particle growth of the alloy is sufficient, so that the case is preferable. When the heat treatment time is 5 hours or less, production efficiency is high, so that the case is preferable.

In addition, the heat treatment of the mixed powder is preferably performed under a non-oxygen atmosphere, more preferably under an inert atmosphere such as a nitrogen atmosphere or an argon atmosphere.

According to the production method of the invention, there can be obtained a platinum-based alloy powder that has a desired particle diameter, also has a sharp particle size distribution, and has high purity and crystallinity.

Here, D50 of the platinum-based alloy powder to be obtained is preferably 10 μm or less, more preferably 0.05 to 10 μm, and most suitably 0.05 to 0.8 μm. D50 of the platinum-based alloy powder means a particle diameter at which the integrated quantity reaches 50% in an integrated particle quantity curve obtained as a result of measuring particle size distribution of the platinum-based alloy powder by a wet laser diffraction method.

Moreover, the platinum-based alloy powder to be obtained is a powder having a sharp particle size distribution, in which D90/D50 is preferably 4 or less, and more preferably 2 or less. Here, D10 and D90 of the platinum-based alloy powder mean particle diameters at which the integrated quantity reaches 10% and 90%, respectively, in an integrated particle quantity curve obtained as a result of measuring particle size distribution of the platinum-based alloy powder by a wet laser diffraction method. Furthermore, D90/D10 represents a numerical value obtained by dividing D90 by D10 and a smaller numerical value shows that the particle size distribution is sharper.

In addition, the platinum-based alloy powder to be obtained has a purity of preferably 99% or more, more preferably 99.9% or more. Incidentally, the purity of the platinum-based alloy powder can be measured by ICP measurement of a solution obtained by chemically dissolving the powder.

The platinum-based alloy powder to be produced by the production method of the invention can be suitably used for electrodes, electrical contacts, catalysts, and the like to be used in sensors and the like.

EXAMPLES

The following will describe the present invention with reference to Examples further in detail but the invention should not be construed as being limited to the following examples.

Example 1

First, 13 parts by weight of a platinum powder (specific surface area: 50 $m^2/g$), 7 parts by weight of an iridium oxide powder (specific surface area: 36 $m^2/g$), and 80 parts by weight of calcium carbonate were compounded, water was added to the compounded mixed powder in an amount three time the amount of the powder based on weight, and the whole was charged into a planetary bead mill (manufactured by Ito Seisakusho Co., Ltd.). Using, as beads, zirconia beads (particle diameter: 1 mm) in an amount four times the total amount of the platinum powder, the iridium oxide powder, calcium carbonate, and water based on weight, a slurry was manufactured by mixing and dispersing the whole at a rotation number of 200 rpm for 4 hours. For the obtained slurry, measurement was performed using a laser diffraction type particle size distribution measuring apparatus (manufactured by Nikkiso Co., Ltd., product name: MT3300II). FIG. 1 shows measurement results of particle size distribution of the slurry. According to the measurement results, D90 of the slurry was 0.734 μm. Moreover, Dmax was 1.6 μm.

Subsequently, water was removed by drying the slurry at 120° C. for 16 hours to obtain a mixed powder. Thereafter, the obtained mixed powder was charged into an electric furnace and, by performing a heat treatment at 1300° C. for 2 hours under a nitrogen atmosphere, calcium carbonate was pyrolyzed into calcium oxide and carbon dioxide and also diffusion of platinum into iridium particles was allowed to proceed in the co-presence of calcium oxide and/or calcium carbonate. Then, calcium oxide was removed by an acid treatment of the heat-treated product with nitric acid. Furthermore, the residue after the acid treatment was washed with water and dried at 120° C. for 2 hours to thereby obtain an objective platinum-iridium alloy powder.

For the obtained platinum-iridium alloy powder, measurement was performed using a laser diffraction type particle size distribution measuring apparatus (manufactured by Nikkiso Co., Ltd., product name: MT3300II). FIG. 2 shows measurement results of particle size distribution of the obtained platinum-iridium alloy powder. According to the measurement results, D50 of the platinum-iridium alloy powder was 0.539 μm. In addition, D10 was 0.313 μm and D90 was 1.05 μm. Therefore, D90/D10 was 3.4.

Moreover, when the purity of the obtained platinum-iridium alloy powder was measured, it was 99.9%. Furthermore, when the obtained platinum-based alloy powder was subjected to measurement using an X-ray diffraction apparatus (manufactured by Rigaku Corporation, product name: ULTRA IV), a peak showing a [331] plane was observed as a sharp peak at 2θ=81.850° with a half width of 0.120° and thus it was confirmed that the powder was a platinum-iridium alloy powder having a high crystallinity. FIG. 3 shows the measurement results.

FIG. 4 shows a SEM photograph of the platinum-iridium alloy powder obtained in Example 1.

Example 2

A mixed powder was manufactured in the same manner as in Example 1 except that the dispersion time at the time of manufacturing the slurry was changed to 6 hours. Incidentally, FIG. 5 shows measurement results of particle size distribution of the slurry. According to the measurement results, D90 of the slurry was 0.73 μm. Moreover, Dmax was 0.972 μm.

Subsequently, a platinum-iridium alloy powder was obtained by the same conditions and method as in Example 1. FIG. 6 shows measurement results of particle size distribution of the obtained platinum-iridium alloy powder. According to the measurement results, D50 of the platinum-iridium alloy powder was 0.648 μm. In addition, D10 was 0.37 μm and D90 was 1.154 μm. Therefore, D90/D10 was 3.1.

Moreover, when the purity of the obtained platinum-iridium alloy powder was measured, it was 99.9%. Furthermore, when the obtained platinum-iridium alloy powder was subjected to X-ray diffraction measurement, it was confirmed that the powder was a platinum-iridium alloy powder having a high crystallinity, which had a peak showing a [331] plane at 2θ=81.906° with a half width of 0.114°, similarly to Example 1. FIG. 7 shows the measurement results.

FIG. 8 shows a SEM photograph of the platinum-iridium alloy powder obtained in Example 2.

Example 3

A mixed powder was manufactured in the same manner as in Example 1 except that an iridium oxide powder having a specific surface area of 71 $m^2/g$ was used instead of the iridium oxide powder having a specific surface area of 36 $m^2/g$. Incidentally, FIG. 9 shows measurement results of particle size distribution of the slurry. According to the measurement results, D90 of the slurry was 0.686 μm. Moreover, Dmax was 1.635 μm.

Subsequently, a platinum-iridium alloy powder was obtained by the same conditions and method as in Example 1. FIG. 10 shows measurement results of particle size distribution of the obtained platinum-iridium alloy powder. According to the measurement results, D50 of the platinum-iridium alloy powder was 0.639 μm. In addition, D10 was 0.531 μm and D90 was 0.807 μm. Therefore, D90/D10 was 1.5.

Moreover, when the purity of the obtained platinum-iridium alloy powder was measured, it was 99.9%. Furthermore, when the obtained platinum-iridium alloy powder was subjected to X-ray diffraction measurement, it was confirmed that the powder was a platinum-iridium alloy powder having a high crystallinity, which had a peak showing a [331] plane at 2θ=81.860° with a half width of 0.110°, similarly to Example 1. FIG. 11 shows the measurement results.

FIG. 12 shows a SEM photograph of the platinum-iridium alloy powder obtained in Example 3.

Comparative Example 1

A mixed powder was manufactured in the same manner as in Example 1 except that an iridium oxide powder having a specific surface area of 8.3 m²/g was used instead of the iridium oxide powder having a specific surface area of 36 m²/g. Incidentally, FIG. 13 shows measurement results of particle size distribution of the slurry. According to the measurement results, D90 of the slurry was 0.699 μm. Moreover, Dmax was 0.972 μm.

Subsequently, a platinum-iridium alloy powder was obtained by the same conditions and method as in Example 1. FIG. 14 shows measurement results of particle size distribution of the obtained platinum-iridium alloy powder. According to the measurement results, D50 of the platinum-iridium alloy powder was 0.465 μm. In addition, D10 was 0.239 μm and D90 was 1.735 μm. Therefore, D90/D10 was 7.3.

Moreover, when the purity of the obtained platinum-iridium alloy powder was measured, it was 99.9%. Furthermore, when the obtained platinum-iridium alloy powder was subjected to X-ray diffraction measurement, it was confirmed that the powder was a platinum-iridium alloy powder having a high crystallinity, which had a peak showing a [331] plane at 2θ=81.860° with a half width of 0.110°. FIG. 15 shows the measurement results.

FIG. 16 shows a SEM photograph of the platinum-iridium alloy powder obtained in Comparative Example 1.

Comparative Example 2

A mixed powder was manufactured in the same manner as in Example 3 except that zirconia beads having a particle diameter of 5 mm was used. Incidentally, FIG. 17 shows measurement results of particle size distribution of the slurry. According to the measurement results, D90 of the slurry was 1.368 μm. Moreover, Dmax was 2.3 μm.

Subsequently, a platinum-iridium alloy powder was obtained by the same conditions and method as in Example 1. FIG. 18 shows measurement results of particle size distribution of the obtained platinum-iridium alloy powder. According to the measurement results, D50 of the platinum-iridium alloy powder was 1.015 μm. In addition, D10 was 0.485 μm and D90 was 2.989 μm. Therefore, D90/D10 was 6.2.

Moreover, when the purity of the obtained platinum-iridium alloy powder was measured, it was 99.9%. Furthermore, when the obtained platinum-iridium alloy powder was subjected to X-ray diffraction measurement, there was confirmed, as a peak showing a [331] plane, a peak at 2θ=82.020° with a half width of 0.130°. As compared with Example 1, the peak of the crystal was shifted to a high angle side by 0.17° and it was confirmed from the integrated intensity that Pt in the alloy was decreased by about 9% by weight. This fact shows that compositional unevenness is generated by segregation of a part of Pt as a coarse powder at the time of drying.

FIG. 20 shows a SEM photograph of the platinum-iridium alloy powder obtained in Comparative Example 2.

Table 1 and FIG. 21 collectively show the specific surface area of the iridium oxide powder, D90 and Dmax of the slurry, and D50, D10, D90, and D90/D10 of the obtained platinum-iridium alloy powder for each of Examples and Comparative Examples. Incidentally, in FIG. 21, the specific surface area of the iridium oxide powder used in each of Examples and Comparative Examples was described in parentheses.

TABLE 1

|  | IrO₂ powder Specific surface area (m²/g) | Slurry | | Platinum-iridium alloy powder | | | |
| --- | --- | --- | --- | --- | --- | --- | --- |
|  |  | D90 | Dmax | D50 | D10 | D90 | D90/D10 |
| Example 1 | 36 | 0.734 | 1.6 | 0.539 | 0.313 | 1.05 | 3.4 |
| Example 2 | 36 | 0.73 | 0.972 | 0.648 | 0.37 | 1.154 | 3.1 |
| Example 3 | 71 | 0.686 | 1.635 | 0.639 | 0.531 | 0.807 | 1.5 |
| Comparative Example 1 | 8.3 | 0.699 | 0.972 | 0.465 | 0.239 | 1.735 | 7.3 |
| Comparative Example 2 | 71 | 1.368 | 2.3 | 1.015 | 0.485 | 2.989 | 6.2 |

As shown in Table 1 and FIG. 21, in Examples 1 to 3 in which the specific surface area of the iridium oxide powder was 30 m²/g or more and D90 of the slurry was 1.0 μm or less, there were obtained platinum-iridium alloy powders having a sharp particle size distribution where D90/D10 was 4 or less.

On the other hand, in Comparative Example 1 in which D90 of the slurry was 1.0 μm or less but the specific surface area of the iridium oxide powder was less than 30 m²/g, D90/D10 of the obtained platinum-iridium alloy powder was 7.3 and one having a sharp particle size distribution was not obtained.

In addition, also in Comparative Example 2 in which the specific surface area of the iridium oxide powder was 30 $m^2/g$ or more but D90 of the slurry was larger than 1.0 μm, D90/D10 of the obtained platinum-iridium alloy powder was 6.2 and one having a sharp particle size distribution was not obtained.

While the invention has been described in detail and with reference to specific embodiments thereof, it will be apparent to one skilled in the art that various changes and modifications can be made therein without departing from the spirit and scope thereof.

Incidentally, the present application is based on Japanese Patent Application No. 2014-162725 filed on Aug. 8, 2014, and the contents are incorporated herein by reference.

The invention claimed is:

1. A method for producing a platinum-based alloy powder, comprising:
   forming a mixed powder by mixing (i) a platinum-based powder composed of at least one selected from the group consisting of platinum and a platinum compound; (ii) a platinum group metal-based powder composed of at least one selected from the group consisting of iridium, rhodium, palladium, and a compound containing at least one of iridium, rhodium, or palladium; and (iii) an alkaline-earth metal compound,
   performing a heat treatment on the mixed powder to form the platinum-based alloy powder,
   wherein the platinum group metal-based powder has a specific surface area of 30 $m^2/g$ or more and the mixed powder has a D90 of 1.0 μm or less.

2. The method for producing a platinum-based alloy powder according to claim 1, wherein the heat treatment temperature is 1000° C. or higher.

3. The method for producing a platinum-based alloy powder according to claim 1, wherein the platinum-based powder has a specific surface area of 20 to 100 $m^2/g$.

4. The method for producing a platinum-based alloy powder according to claim 1, wherein the amount of the alkaline-earth metal compound in the mixed powder is 0.5 to 10 times the total amount of the platinum-based powder and the platinum group metal-based powder based on weight.

5. The method for producing a platinum-based alloy powder according to claim 1, wherein the platinum-based alloy powder has a D90/D10 of 4 or less.

6. The method for producing a platinum-based alloy powder according to claim 1, wherein the platinum-based alloy powder has a D50 of 10 μm or less.

* * * * *